(12) United States Patent
Belling

(10) Patent No.: US 11,388,202 B2
(45) Date of Patent: *Jul. 12, 2022

(54) NETWORK ENTITY SELECTION

(71) Applicant: Nokia Solutions and Networks Oy, Espoo (FI)

(72) Inventor: Thomas Belling, Erding (DE)

(73) Assignee: Nokia Solutions and Networks Oy, Espoo (FI)

(*) Notice: Subject to any disclaimer, the term of this patent is extended or adjusted under 35 U.S.C. 154(b) by 32 days.

This patent is subject to a terminal disclaimer.

(21) Appl. No.: 16/055,653

(22) Filed: Aug. 6, 2018

(65) Prior Publication Data
US 2018/0352008 A1 Dec. 6, 2018

Related U.S. Application Data

(63) Continuation of application No. 12/989,265, filed as application No. PCT/EP2008/055093 on Apr. 25, 2008, now Pat. No. 10,051,012.

(51) Int. Cl.
*H04L 65/1043* (2022.01)
*H04M 7/12* (2006.01)
(Continued)

(52) U.S. Cl.
CPC ........ *H04L 65/1043* (2013.01); *H04L 65/103* (2013.01); *H04L 65/104* (2013.01);
(Continued)

(58) Field of Classification Search
CPC ....... H04W 88/18; H04W 8/12; H04W 8/183; H04W 8/18; H04W 8/26; H04W 4/12; H04W 88/16; H04W 12/08; H04W 12/10; H04L 65/103; H04L 63/102; H04L 63/126; H04L 63/14; H04L 63/164; H04L 65/1006; H04L 65/1023; H04L 65/104; H04L 65/1043; H04L 65/1069
See application file for complete search history.

(56) References Cited

U.S. PATENT DOCUMENTS

2006/0099951 A1    5/2006  Park
2006/0245368 A1*  11/2006  Ladden ................ H04W 24/08
                                                       370/248
(Continued)

FOREIGN PATENT DOCUMENTS

EP    1 824 278 A1      8/2007
WO    WO-2002/017038 A2  2/2002
WO    WO-2004/112415 A2 12/2004

OTHER PUBLICATIONS

RFC4566, Handleym M. et al. "SDP: Session Description Protocol" Jul. 2006, 49 pgs.

*Primary Examiner* — Khaled M Kassim
*Assistant Examiner* — Najeeb Ansari
(74) *Attorney, Agent, or Firm* — Joseph C. Drish; Harrington & Smith

(57) ABSTRACT

There are disclosed measures of network entity selection, for example including furnishing an identity of a network entity being pre-selected by a first network apparatus, and providing verification information for said pre-selected network entity identity, enabling to verify whether the pre-selected network entity identity is applicable for network entity selection at a second network apparatus.

25 Claims, 13 Drawing Sheets

(51) Int. Cl.
*H04L 65/1033* (2022.01)
*H04L 65/80* (2022.01)
*H04L 65/1023* (2022.01)
*H04W 88/16* (2009.01)

(52) U.S. Cl.
CPC .......... *H04L 65/80* (2013.01); *H04M 7/1285* (2013.01); *H04W 88/16* (2013.01)

(56) References Cited

U.S. PATENT DOCUMENTS

| | | | |
|---|---|---|---|
| 2007/0053343 A1 | 3/2007 | Suotula et al. | |
| 2007/0147398 A1* | 6/2007 | Upp | H04L 65/103 370/401 |
| 2009/0010270 A1* | 1/2009 | Ejzak | H04L 61/2546 370/401 |
| 2009/0279555 A1 | 11/2009 | Belling | |
| 2010/0217837 A1 | 8/2010 | Ansari et al. | |
| 2010/0274905 A1* | 10/2010 | Pantaleo | H04L 65/1023 709/227 |
| 2011/0122815 A1* | 5/2011 | Velev | H04L 45/22 370/328 |
| 2013/0176944 A1 | 7/2013 | Luo et al. | |

* cited by examiner

NETWORK ENTITY SELECTION

CROSS-REFERENCE TO RELATED APPLICATIONS

This patent application is a continuation of U.S. patent application Ser. No. 12/989,265, filed on Oct. 22, 2010, now U.S. Pat. No. 10,051,012, granted Aug. 14, 2018, which was the National Stage of International Application No. PCT/EP08/55093, filed on Apr. 25, 2008. The patent applications identified above are fully incorporated herein by reference in their entirety to provide continuity of disclosure.

TECHNICAL FIELD

The present invention generally relates to network entity selection in a communication system. In particular, embodiments of the present invention relate to network entity selection in a circuit-switched core network of a communication system. By way of the present invention, any kind of network entity may be selected, e.g. media gateways.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

Currently, standardization work for present and future communication systems generally aims at achieving more convergence, flexibility and technology-independent implementations. Among others, certain efforts are directed to bearer-independent core networks in communication systems. Although the present specification exemplarily refers to the circuit-switched (CS) domain of core networks (CN), the following may also apply to the packet-switched domain of core networks or even network parts other than the core network itself, e.g. a public land mobile network (PLMN).

Notwithstanding the above, FIG. 1 shows an exemplary logical network architecture of a circuit-switched core network, upon which the following description may be based and the described principles may be applied.

Irrespective of the details of FIG. 1, on the one hand there may be any other number of certain elements, and on the other hand there may also be an arbitrary number of intermediate elements there-between (as e.g. depicted in other figures). Although the designations used in FIG. 1 relate to 3GPP (3rd Generation Partnership Project) terminology, it is to be noted that such terminology (also when used hereinafter) is solely intended as an example, and any other elements with different designations according to a different terminology may also be used, as long as the basic underlying principles, conditions and/or premises are comparable. This applies for example to the individual elements as well as to the individual interfaces (reference points) illustrated. In particular, when hereinafter reference is made to media gateways as a non-limiting example for a network entity, any other network entity (i.e. for example a network element or a functional part of a network element) is equally applicable, for example a gateway attached to a session border controller (SBC) that performs IP and/or port conversion but passes media transparently.

The exemplary logical CS core network architecture according to FIG. 1 comprises two mobile services switching centers (MSC), one of which is a gateway mobile services switching center (GMSC). Although monolithic mobile services switching centers may also be used, there are illustrated combined MSC nodes having a decomposed architecture (i.e. Softswitch architecture) consisting of an MSC/GMSC server (G/MSC-S) as a controlling entity and an attached media gateway (MGW), respectively. As an example, the core network is operationally connected with a GERAN (GSM EDGE radio access network; GSM=Global System for Mobile Communications; EDGE=Enhanced Data rates for GSM Evolution) and with an UTRAN (Universal Terrestrial Radio Access Network), as well as with a PSTN (Public Switched Telephone Network).

As a call control protocol within a network architecture such as the CS core network according to FIG. 1, there have been proposed bearer-independent call control (BICC) and a certain modification of the session initiation protocol, namely session initiation protocol with encapsulated ISDN (Integrated Services Digital Network) user part (SIP-I). While both BICC and SIP-I may be regarded as alternatives for call/session control, so-called optimized and deferred media gateway selection procedures have been proposed for call control based on BICC as well as on SIP-I.

In the case of SIP-I-based call control, an optimized MGW selection as currently defined comprises that one node (e.g. a MSC/GMSC server) selects a media gateway (MGW) according to some rules and signals the identity of the selected media gateway in a SIP-I message to another node (e.g. a MSC/GMSC server). Thus, the other node receiving the SIP-I message is enabled to select the same media gateway, if it has a Mc interface to the selected media gateway, thus saving media gateway and transport network resources. A deferred MGW selection as currently defined provides the opportunity for the receiver of a SIP-I message to select the media gateway, which it prefers, and to send back the identity of the selected media gateway to the preceding node in order to enable that node to select the same media gateway. Additionally, the procedures allow the offerer to send a "proposed" media gateway identity to the next SIP-I node, which may be taken into account when the succeeding node seizes a media gateway.

As the optimized and deferred media gateway selection procedures are currently defined to be optional procedures, it is foreseeable that communication systems or networks will comprise both nodes supporting such procedures and nodes not supporting such procedures. This will lead to compatibility problems when an intermediate node within such a procedure is not able to handle respective (Signaling) traffic appropriately.

Further, for the encoding of an identity of a selected media gateway for transmission from one node to another in optimized and deferred media gateway selection, there have not yet been defined specific procedures. This may also lead to compatibility problems.

One conceivable approach for media gateway identity encoding resides in the use of a session description protocol (SDP) attribute, resulting in that SDP is transported within SIP, or more specifically SIP-I, signaling.

In view of the above-mentioned optionality of both media gateway selection procedures in general and the use of a SDP as a specific encoding for media gateway identities, this means that not every node in a CS CN may understand such a new SDP attribute encoding an MGW identity. According to current SIP procedures, intermediate nodes will transparently forward any unknown SDP attributes, e.g. the one encoding an MGW identity. However, assuming that the originating node MSC A has selected MGW A and has indicated its identity in such a new SDP MGW identity attribute, and an intermediate (call control) node B not understanding the MGW identity SDP attribute forwards that unknown attribute in IP signaling towards a subsequent node and, at the same time, inserts another MGW B, the forwarded MGW identity A may misguide the subsequent node, e.g. MSC C, to select the suboptimal MGW A. This will lead to a configuration where the user plane traffic is transported from MGW A to MGW B and back to MGW A.

It is to be noted that resource savings are at a media gateway handling a call controlled by two servers are only possible, if the call (i.e. the user plane traffic) remains within the same media gateway between the two partitions of the MGW (i.e. "logical MGWs") controlled by the two servers (e.g. MSC A and MSC B). If on the other hand an MSC server knows that it cannot achieve this optimization, it may use other criteria to optimize the MGW selection, for instance the proximity to the next hop where it decides to route the connection or call to be established (note that, when some kind connection or call is concerned, a network address as mentioned below may also be denoted as connection address).

The above drawbacks are detrimental as to a smooth operation of present and future communication systems and networks in which some kind of media gateway selection is performed.

For overcoming such detrimental effects, it has to be noted that present media gateway selection procedures are defined to be optional. Thus, any solution mandating any node to operate in a certain way (in media gateway selection) is not in line with the optional character thereof, thus being unsuited. In this regard, for example mandatory measures taken for media gateway selection based on BICC are not applicable for media gateway selection based on SIP or SIP-I. This is because applying similar procedures for SIP or SIP-I would require that every node in the core network is mandated to recognize this attribute, which is in conflict with the desired optionality of the procedure. In particular, session border controllers (SBC) acting as SIP-ALGs (application level gateways) may be deployed that insert a user plane entity for IP (Internet Protocol) address conversion and firewalling purposes that does not transcode. At the same time, such SBC may forward unknown SDP attributes transparently.

With respect to the above, it has to be noted that the same or similar drawbacks also exist for the selection of network entities other than media gateway, for example a gateway attached to a session border controller (SBC) that performs IP and/or port conversion but passes media transparently.

Accordingly, there does not exist any feasible solution to the above drawbacks, in particular regarding for example SIP-I-based media gateway selection.

The current invention moves beyond the current techniques and/or materials.

BRIEF SUMMARY

This section is intended to include examples and is not intended to be limiting. The word "exemplary" as used herein means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The present invention and its embodiments are made to address one or more of the above-described drawbacks. Thus, the present invention and its embodiments are intended to mitigate drawbacks in network entity selection, for example compatibility problems resulting from the optional character thereof.

According to one exemplary aspect of the present invention, there is provided a method of network entity selection, comprising furnishing an identity of a network entity being pre-selected by a first network apparatus, and providing verification information for said pre-selected network entity identity, enabling to verify whether the pre-selected network entity identity is applicable for network entity selection at a second network apparatus.

According to further developments or modifications thereof, one or more of the following applies:
- the method further comprises transmitting the pre-selected network entity identity and the verification data to the second apparatus in a session initiation protocol message,
- the furnishing of the identity comprises encoding the pre-selected network entity identity in a session description protocol attribute, and the providing of the verification information comprises adding a network address of the pre-selected network entity to said session description protocol attribute, and/or
- the method further comprises defining a network address of the pre-selected network entity as session description protocol connection data, and transmitting the thus defined network address as session description protocol connection data in a session initiation protocol message.

According to one exemplary aspect of the present invention, there is provided a method of network entity selection, comprising obtaining an identity of a network entity being pre-selected by a first apparatus and verification information for said pre-selected network entity identity, and verifying, on the basis of the verification information, whether the obtained network entity identity is applicable for network entity selection.

According to further developments or modifications thereof, one or more of the following applies:
- the method further comprises receiving the pre-selected network entity identity and the verification data in a session initiation protocol message,
- the session initiation protocol message contains the pre-selected network entity identity and a network address of the pre-selected network entity in a session description protocol attribute, and a network address of the pre-selected network entity as session description protocol connection data.
- the method further comprises retrieving the network address of the pre-selected network entity from the session description protocol connection data, and the obtaining of the verification information comprises obtaining the network address of the pre-selected network entity from the session description protocol attribute,
- the verifying comprises comparing the obtained network address in the session description protocol attribute and the retrieved network address of the session description protocol connection data with each other,
- the method further comprises using the obtained network entity identity for network entity selection, if the comparison yields that the compared network addresses are equal, and discarding the obtained network entity identity, if the comparison yields that the network addresses are not equal, and/or the method further comprises removing the session description protocol attribute from the session initiation protocol message.

According to any one of the above-mentioned aspects, the network address of the pre-selected network entity may comprise an Internet protocol address for a communication via said network entity, and/or the method may be performed by a mobile services switching center apparatus, and/or the method may be performed in a circuit-switched core network of a communication system, and/or the network entity may be a media gateway.

According to one exemplary aspect of the present invention, there is provided an apparatus, comprising means for furnishing an identity of a network entity being pre-selected by a first network apparatus, means for providing verification information for said pre-selected network entity identity, enabling to verify whether the pre-selected network entity identity is applicable for network entity selection at a second network apparatus.

According to further developments or modifications thereof, one or more of the following applies:

the apparatus further comprises means for transmitting the pre-selected network entity identity and the verification data to the second apparatus in a session initiation protocol message, the furnishing means comprises means for encoding the pre-selected network entity identity in a session description protocol attribute, and the providing means comprises means for adding a network address of the pre-selected network entity to said session description protocol attribute, and/or the apparatus further comprises means for defining a network address of the pre-selected network entity as session description protocol connection data, the transmitting means is further configured to transmit the thus defined network address as session description protocol connection data in a session initiation protocol message.

According to one exemplary aspect of the present invention, there is provided an apparatus, comprising means for obtaining an identity of a network entity being pre-selected by a first apparatus and verification information for said pre-selected network entity identity, and means for verifying, on the basis of the verification information, whether the obtained network entity identity is applicable for network entity selection.

According to further developments or modifications thereof, one or more of the following applies:

the apparatus, further comprises means for receiving the pre-selected network entity identity and the verification data in a session initiation protocol message, the receiving means is configured to receive a session initiation protocol message containing the pre-selected network entity identity and a network address of the pre-selected network entity in a session description protocol attribute, and a network address of the pre-selected network entity as session description protocol connection data, the apparatus further comprises means for retrieving the network address of the pre-selected network entity from the session description protocol connection data, and the obtaining means comprises means for obtaining the network address of the pre-selected network entity from the session description protocol attribute, the verifying means comprises means for comparing the obtained network address in the session description protocol attribute and the retrieved network address of the session description protocol connection data with each other, the apparatus further comprises means for using the obtained network entity identity for network entity selection, if the comparison means yields that the compared network addresses are equal, and means for discarding the obtained network entity identity, if the comparison means yields that the compared network addresses are not equal, and/or the apparatus further comprises means for removing the session description protocol attribute from the session initiation protocol message.

According to any one of the above-mentioned aspects, the network address of the pre-selected network entity may comprise an Internet protocol address for a communication via said network entity, and/or the apparatus may comprise a mobile services switching center apparatus and/or the apparatus may be located in a circuit-switched core network of a communication system, and/or the network entity may be a media gateway.

According to one exemplary aspect of the present invention, there is provided a computer program product comprising program code means being arranged, when run on a processor of an apparatus, to perform any one of the methods according to any one of the above aspects.

According to one exemplary aspect of the present invention, there is provided a data structure comprising a session description protocol attribute containing an identity of a media gateway and a network address of the media gateway.

According to one exemplary aspect of the present invention, there is provided a data structure comprising a session initiation protocol message containing an identity of a media gateway and a network address of the media gateway in a session description protocol attribute, and a network address of the media gateway as session description protocol connection data.

Further aspects, embodiments and modifications according to the present invention and its embodiments are set out in respective dependent claims.

By way of exemplary embodiments of the present invention, a network entity to be selected may for example be a media gateway.

By way of exemplary embodiments of the present invention, there is for example provided at least one way to detect an incompliance between a network entity (e.g. media gateway) identity or identifier being pre-selected at one network apparatus, where the selected network entity identity or identifier is passed via an intermediate node to another network apparatus, and the received network entity identity or identifier to be used in the network entity selection process at the other network apparatus. Such a detection may for example comprise that the one network apparatus provides means for indicating such an incompliance, and that the other network apparatus is able to recognize the incompliance by way of the thus provided means.

By way of exemplary embodiments of the present invention, there are for example provided certain measures to avoid that a network entity (e.g. media gateway) selection at a network apparatus (such as e.g. a mobile services switching center) is misguided by a network entity (e.g. media gateway) identity or identifier from an preceding node, as well as measures to avoid a need to support the network entity (e.g. media gateway) identity or identifier (i.e. its selection and/or encoding) in all nodes or network apparatuses in a communication system or network.

BRIEF DESCRIPTION OF THE DRAWINGS

In the following, the present invention will be described in greater detail by way of non-limiting examples with reference to the accompanying drawings, in which.

DETAILED DESCRIPTION OF THE DRAWINGS

The present invention is described herein with reference to particular non-limiting examples. A person skilled in the art will appreciate that the invention is not limited to these examples, and may be more broadly applied.

In particular, the present invention and its embodiments is mainly described in relation to a circuit-switched (CS) core network (CN), which may be defined according to 3GPP specifications, used as a non-limiting example for a network configuration. As such, the description of the embodiments given herein specifically refers to terminology which is directly related thereto. Furthermore, the present invention and its embodiments are mainly described in relation to media gateway selection, although a selection of any kind of network entity or network element is equally applicable. Also, SDP and SIP terminology is used for session signaling purposes, while any other session signaling mechanism may also be utilized as long as compliant with the described features. Such terminology is only used in the context of the presented non-limiting examples, and does naturally not limit the invention in any way.

Figure 1:
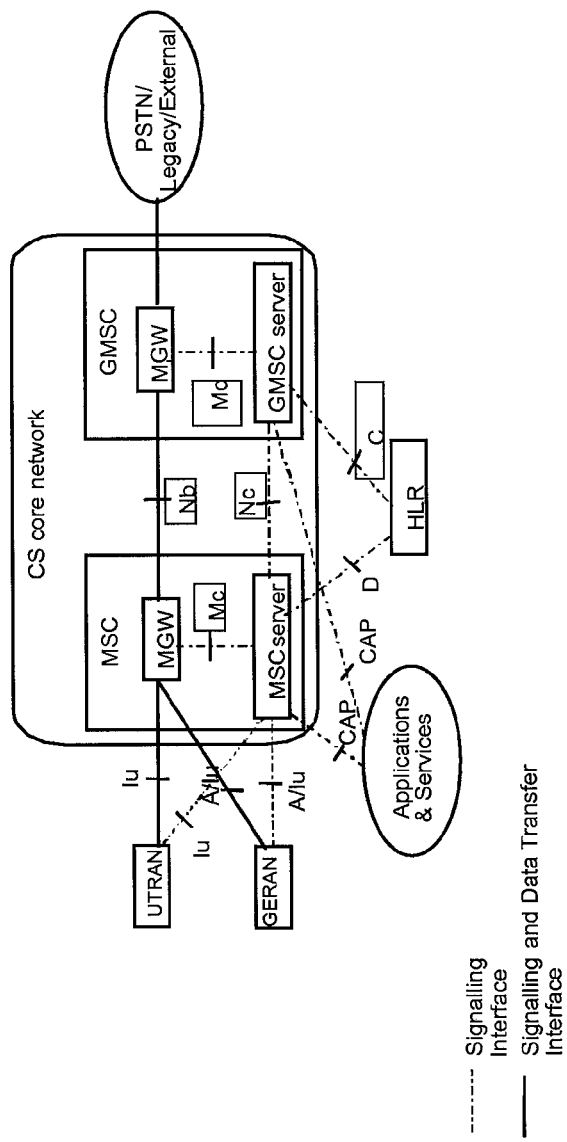
FIG. 1 shows a logical network architecture of a circuit-switched core network where exemplary embodiments of the present invention may be applied.

For the basic logical network architecture exemplarily underlying the following exemplary description, reference is made to FIG. 1.

Stated in general terms, embodiments of the present invention relate to a verification of a network entity (e.g. media gateway) identity to be possibly used in a network entity (e.g. media gateway) selection procedure. To this end, embodiments of the present invention comprise, among others, examples of methods and apparatuses and software and data structures, which are configured for signaling network entity (e.g. media gateway) identities between network apparatuses or nodes. As one non-limiting example, such embodiments may be configured for a signaling based on a session initiation protocol (SIP), e.g. a session initiation protocol with encapsulated ISDN user part (SIP-I), wherein for example session description protocol (SDP) data is transported. Such a signaling may for example occur between mobile services switching centers (MSC), whether implemented in a monolithic or combined manner (in the latter case between mobile MSC servers), in a circuit-switched core network e.g. of a public land mobile network (PLMN) according to current standards (e.g. by 3GPP, ETSI, or the like).

In the following, for the sake of simplicity, the term "media gateway" is used as a non-limiting example for any kind of network entity, without restricting the described teaching thereto.

Figure 2:
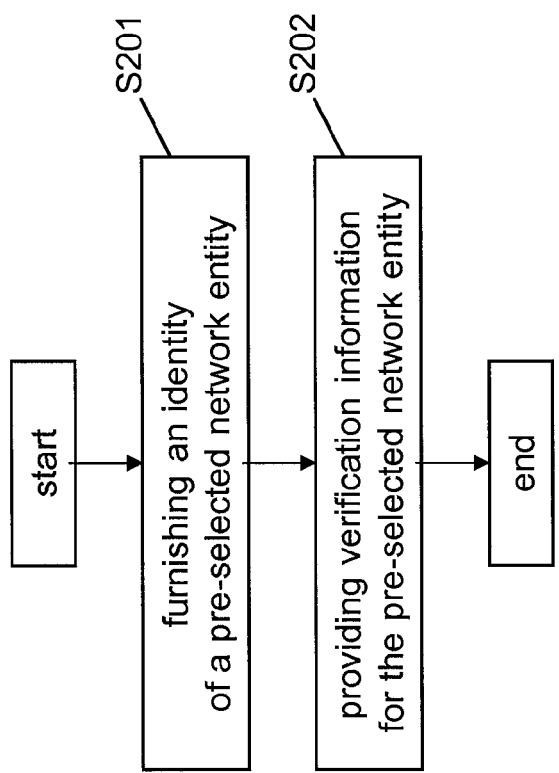
FIG. 2 shows a flow diagram of a first method according to an exemplary embodiment of the present invention.

FIG. 2 shows a flow diagram of a method according to an exemplary embodiment of the present invention.

According to the method of FIG. 2, an identity of a pre-selected media gateway (MGW) is furnished (operation S201), and verification information is provided (operation S202). The thus provided verification information is associated with the selected MGW identity and enables a network apparatus receiving the MGW identity and the verification information to verify whether the thus received media gateway identity is applicable for MGW selection at that apparatus. Thus, it may be avoided that a receiving network apparatus is misguided in media gateway selection in that an identity of a pre-selected media gateway (chosen at a sending network apparatus) is somehow altered or made ambiguous during the transmission from the sending network apparatus to the receiving network apparatus. Accordingly, the method of FIG. 2 may preferably be performed at an originating side of a media gateway selection procedure, e.g. at the first network apparatus (e.g. MSC), or at the sending side of any intermediate network apparatus (e.g. MSC) in MGW selection.

That is, the method of FIG. 2 describes a way how to indicate to a remote network apparatus (e.g. MSC) that a MGW identity transparently passed (e.g. via an intermediate node) through a network is not applicable for media gateway selection at the remote network apparatus.

Figure 3:
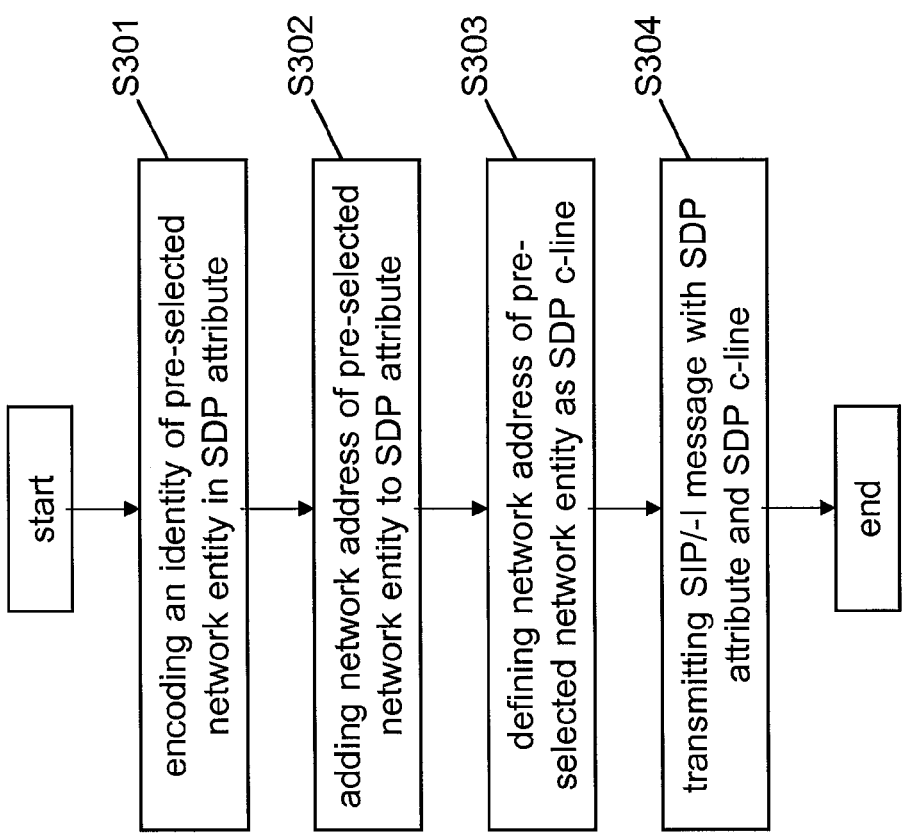
FIG. 3 shows a flow diagram of a second method according to an exemplary embodiment of the present invention.

FIG. 3 shows a flow diagram of a method according to an exemplary embodiment of the present invention. For the thus depicted method, it is exemplarily assumed that the MGW identity is transported in a SDP attribute within a SIP or SIP-I message.

According to the method of FIG. 3, an identity of a pre-selected media gateway (MGW) is furnished by way of encoding the pre-selected MGW identity in an SDP attribute (operation S301), and the verification information is provided by way of adding a network address of the pre-selected media gateway to an SDP attribute as well, i.e. a network address chosen for a corresponding connection or call to be established (note that, when some kind connection or call is concerned, a network address as mentioned below may also be denoted as connection address). Although not being limited thereto, the network address (connection address) may be an IP (Internet Protocol of any conceivable version, e.g. IPv4 or IPv6) address of the pre-selected media gateway, which is used to transport user plane traffic. Furthermore, the pre-selected MGW identity and a network (IP) address of the pre-selected media gateway may be incorporated in the same SDP attribute/extension or distinct SDP attributes/extensions associated with each other. Such an attribute may for example be a session level attribute or a media level attribute. A network address can for instance be a "connection address", as transferred in the SDP c-line according to in RFC 4566. Alternatively, any other conceivable parameter or message field for transportation of these elements may be used instead or in addition to an SDP attribute. In operation S303, a network address of the pre-selected media gateway (e.g. IP address) is defined as SDP connection data. Namely, according to current SDP procedures, the network address (e.g. IP address) for the corresponding connection or call to be established is included in a respective parameter. For the purposes of the present description, it is assumed, although not being limiting, that this parameter is the "c-line" according to SDP specifications. The network address included in the SDP "c-line" (operation S303) is naturally the same as the network address added to the aforementioned SDP attribute (operation S302). Subsequently, an SIP (more specifically, SIP-I) message is transmitted in operation S304, which contains at least the selected MGW identity and the verification information (i.e. IP address, for example) as SDP attribute, and preferably also the defined network (IP) address as the SDP "c-line". The message may contain this attribute either in an SDP offer or SDP answer. Accordingly, the method of FIG. 3 may for example be performed at an originating side of a media gateway selection procedure, e.g. at the first network apparatus (e.g. MSC) performing MGW selection, or at the sending side of any intermediate network apparatus (e.g. MSC) in MGW selection.

Figure 4:
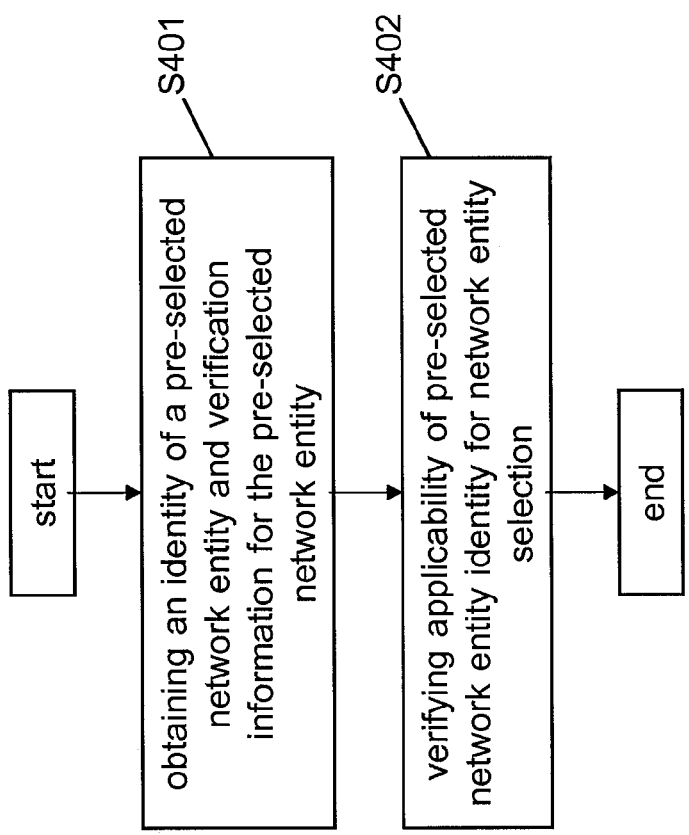
FIG. 4 shows a flow diagram of a third method according to an exemplary embodiment of the present invention.

FIG. 4 shows a flow diagram of a method according to an exemplary embodiment of the present invention.

According to the method of FIG. 4, an identity of a pre-selected or recommended media gateway (MGW) and verification information associated with this MGW identity are obtained in operation S401. In operation S402, it is verified whether the pre-selected network entity identity is applicable for network entity selection at the apparatus performing the present method, i.e. a second network apparatus. Thus, it may be avoided that the receiving second network apparatus is misguided in the media gateway selection process in that an identity of a pre-selected media gateway intended to be used is somehow altered or made ambiguous during the transmission from the sending network apparatus to the receiving second network apparatus. Accordingly, the method of FIG. 4 may for example be performed at a terminating side of a media gateway selection procedure, e.g. at the second network apparatus performing a MGW selection process, or at the receiving side of any intermediate network apparatus (e.g. MSC) performing a MGW selection process.

Figure 5:
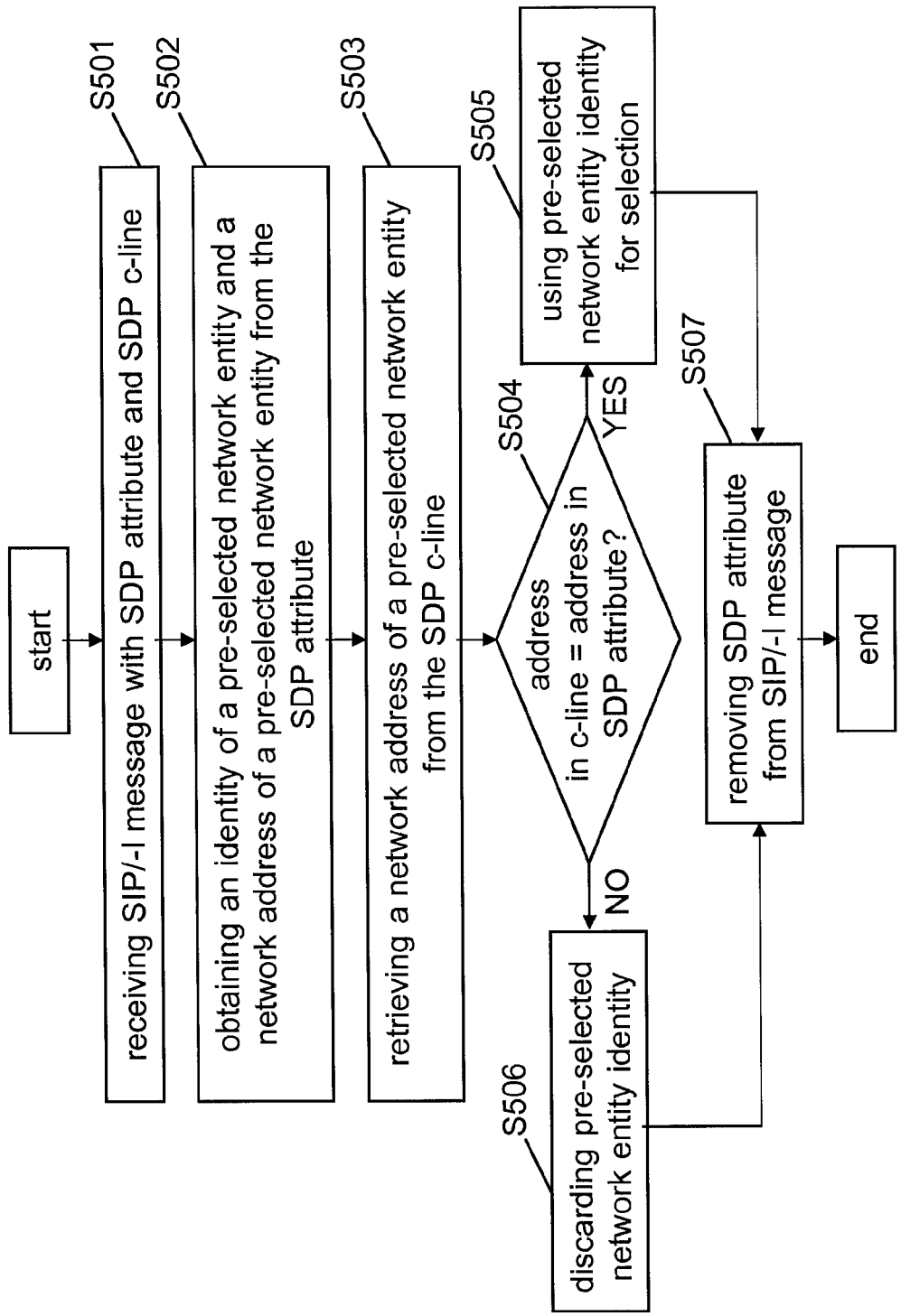
FIG. 5 shows a flow diagram of a fourth method according to an exemplary embodiment of the present invention.

FIG. 5 shows a flow diagram of a method according to an exemplary embodiment of the present invention. For the thus depicted method, it is exemplarily assumed that the MGW identity is transported in a SDP attribute within a SIP or SIP-I message.

According to the method of FIG. 5, an identity of a pre-selected or recommended media gateway (MGW) and verification information associated with the pre-selected MGW identity are received in a SIP or SIP-I message (operation S501), and then are obtained therefrom, namely from a SDP attribute thereof (operation S502). The message may contain this attribute either in an SDP offer or SDP answer. According to a non-limiting example, which corresponds to the non-limiting example according to the method of FIG. 3, the received message contains the pre-selected media gateway identity and a network address of the pre-selected media gateway in a SDP attribute, and a network address of the pre-selected media gateway as SDP connection data, wherein the network address may preferably be an IP address. If so, which is assumed here, operation 502 obtains a network (e.g. IP) address of the pre-selected media gateway as the verification data. In the thus received SIP or SIP-I message, according to current SDP specifications, SDP connection data is included e.g. in a SDP "c-line", wherein this connection data in the "c-line" may be altered by intermediate nodes on the passage between the sending network apparatus and the receiving network apparatus. This connection data, e.g. namely the network address of the pre-selected media gateway, is also retrieved from the connection data, i.e. "c-line" (operation S503). Then, for verifying the received MGW identity, in operation S504, the network (IP) address in the SDP "c-line" is compared with the network address in the aforementioned SDP attribute. If the comparison of operation S504 yields that the network addresses are equal, i.e. the received MGW identity is applicable for MGW selection, the received MGW identity is used for MGW selection (operation S505). Otherwise, if the comparison of operation S504 yields that the network addresses are not equal, i.e. the received MGW identity is not applicable for MGW selection, the received MGW identity is discarded and not used for MGW selection (operation S506). In any case the received SDP attribute containing the pre-selected MGW identity and the IP address of the pre-selected MGW identity, as added by a sending network apparatus, may be removed from the SIP or SIP-I message (operation S507. Optionally, which is not shown in FIG. 5, the thus modified SIP or SIP-I message may be forwarded to another node or network apparatus. Accordingly, the method of FIG. 5 may for example be performed at a terminating side of an apparatus performing a media gateway selection procedure, or at the receiving side of any intermediate network apparatus (e.g. MSC).

For more details concerning the above-described methods of FIG. 2 to FIG. 5, reference is made to the exemplary flow chart of FIG. 6 to FIG. 9.

Figure 6:
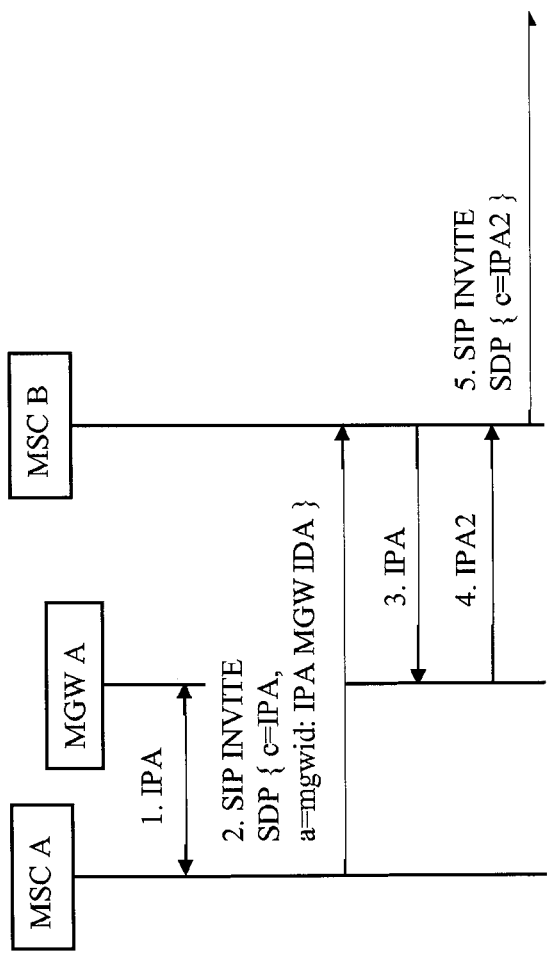
FIG. 6 shows a signaling diagram of an optimized media gateway selection according to an exemplary embodiment of the present invention.

FIG. 6 shows a signaling diagram of an optimized media gateway selection according to an exemplary embodiment of the present invention.

According to FIG. 6, a first apparatus MSC A requests a reservation of a new termination from media gateway MGW A. MGW A confirms the reservation of that termination and indicates that it allocated network (IP) address IPA to that termination (step 1). It is to be noted that a MGW may contain several interfaces with separate IP addresses. The MSC A thus pre-selects media gateway MGW A, wherein the network address IPA is used for a corresponding call establishment via the pre-selected media gateway. In step 2, MSC A generates a SIP or SIP-I message, in this case SIP INVITE, and transmits it to a subsequent node B. The thus transmitted message contains, as a non-limiting example, encapsulated SDP including a SDP "c-line" ("c=") reciting the network address IPA assigned by MGW A according to normal SIP/SDP rules and a SDP attribute ("a=") called "mgwid" reciting both a unique pre-selected (thus recommended) MGW identity MGWIDA and an added network address IPA corresponding to the pre-selected media gateway as verification data. When receiving this message, among others, the MSC B determines on the basis of the "c-line" content, i.e. IPA, the destination for media (i.e. user plane traffic). Also, the content of the "c-line", i.e. IPA, is found to be equal to the content of the verification data in the SDP attribute, i.e. IPA. Hence, it is found that the received media gateway identity MGWIDA in the SDP "mgwid" attribute should be used for the media gateway selection process. It also determines that it has a control interface towards MGW A and decides to request the reservation of resources at this media gateway. It instructs the MGW to reserve resources for a termination that sends media towards IP address IPA and to reserve resources for another termination (step 3). Media gateway MGW A determines that IP address IPA for the first termination is an own IP address and configures some internal shortcut to connect that termination with the termination reserved in step 1, thereby saving external transport resources and internal processing resources. In step 4, MGW A confirms the reservation of the resources and indicates that it allocated network (IP) address IPA2 to the second termination. For the purposes of continuing the call setup, node B itself may generate a corresponding SIP or SIP-I message for forwarding, in this case a SIP INVITE (step 5). In this message, network address IPA2 is inserted in the SDP "c-line". The message may also include a SDP attribute "mgwid" as mentioned before.

Thus, according to the operation of FIG. 6, MSC A is configured to perform any one of the methods of FIG. 2 and FIG. 3 at the sending side, while node B is configured to perform any one of methods of FIG. 4 and FIG. 5 at the receiving side as well as any one of methods of FIG. 2 and FIG. 3 at the sending side.

Figure 7:
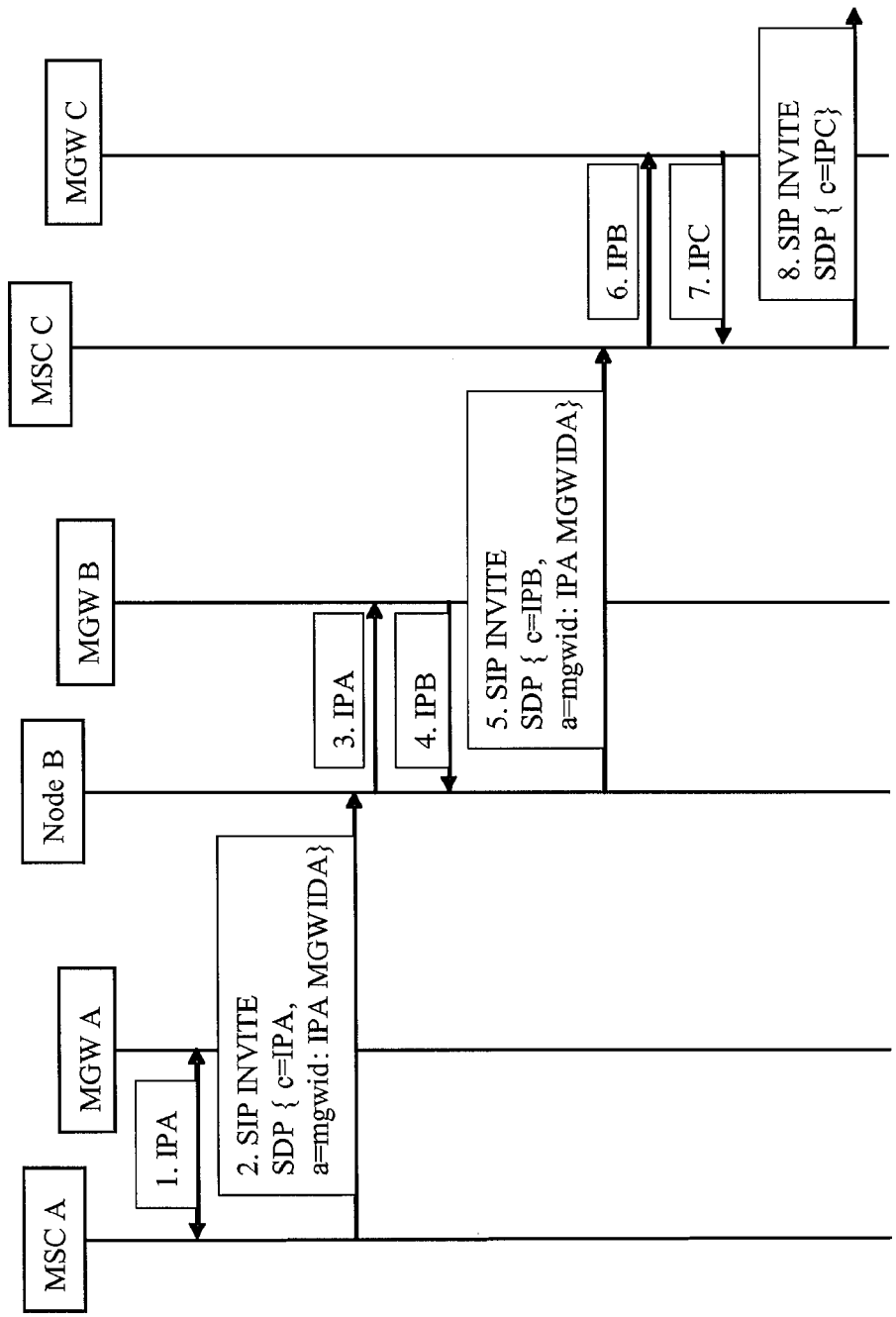
FIG. 7 shows a signaling diagram of an optimized media gateway selection with an intermediate node according to an exemplary embodiment of the present invention.

FIG. 7 shows a signaling diagram of an optimized media gateway selection with an intermediate node according to an exemplary embodiment of the present invention. It is assumed that the intermediate node B does not support MGW selection based on SIP or SIP-I with MGW identity encoding according to SDP.

Steps 1 and 2 of FIG. 7 are equivalent to those of FIG. 6. In contrast to node B of FIG. 6, node B of FIG. 7 does not have an interface with media gateway MGW A, but with media gateway MGW B using network address IPB. Node B, which e.g. is a SBC or SIP-ALG, that does not support optimized MGW selection and the related "mgwid" attribute, receives the SIP INVITE message from MSC A and ignores the "mgwid" attribute. It inserts an own MGW B, which may either be in the same physical entity as the node B or in a splitted separate physical entity. The MGW B may for instance be inserted for IP version conversion or as a media plane firewall and may pass media without transcoding. Node B instructs the MGW B to reserve resources for a termination that sends media towards IP address IPA and to reserve resources for another termination (step 3). MGW B confirms the reservation of the resources and indicates that it allocated IP address IPB to the second termination (step 4). According to SDP procedures, the node B inserts this network address IPB in the SDP "c-line" (because of being willing to establish a call or connection via its associated media gateway MGW B), but transparently passes (i.e. does not change) the SDP attribute which is deemed to be unknown at node B (step 5). The subsequent node MSC C has an interface with media gateway MGW C. When receiving the message sent by intermediate node B, among others, the MSC C determines that the content of the "c-line", i.e. IPB, is not equal to the content of the verification data in the SDP attribute, i.e. IPA. Hence, it is found that the received media gateway identity MGWIDA shall not be used for MGW selection. Rather, MSC C recognizes that optimized MGW selection is not applicable, removes the SDP attribute from the received message. Further, MSC C selects media gateway MGW C, which selection may for instance determine a MGW in an optimized location with respect to the next hop where MSC C routes the call. MSC C instructs the MGW C to reserve resources for a termination that sends media towards IP address IPB and to reserve resources for another termination, and MGW C confirms the reservation of the resources and indicates that it allocated IP address IPC to the second termination (steps 6 and 7). Then, it inserts its network address to its associated media gateway MGW C into the SDP "c-line", i.e. IPC, and forwards this generated SIP or SIP-I message (step 8). The message may also include a SDP attribute "mgwid" as mentioned before Thus, according to the operation of FIG. 7, MSC A is configured to perform any one of the methods of FIG. 2 and FIG. 3 at the sending side, node B is configured to not perform any one of the methods described herein, and MSC C is configured to perform any one of methods of FIG. 4 and FIG. 5 at the receiving side as well as any one of methods of FIG. 2 and FIG. 3 at the sending side.

Figure 8:
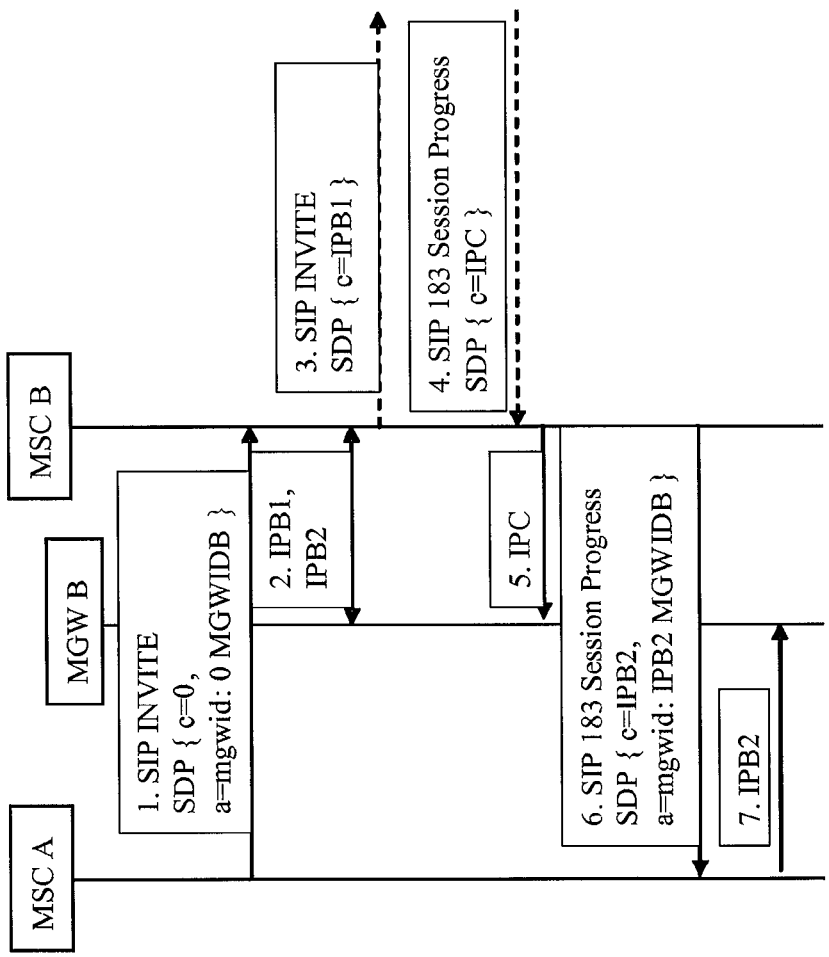
FIG. 8 shows a signaling diagram of a deferred media gateway selection according to an exemplary embodiment of the present invention.

FIG. 8 shows a signaling diagram of a deferred media gateway selection according to an exemplary embodiment of the present invention.

According to FIG. 8, a first apparatus MSC-A decides to apply the deferred MGW selection procedure and not to select or pre-select a MGW at this stage. MSC A indicates to the subsequent node B that MSC A will not select or pre-select a media gateway. This is effected by sending a SIP INVITE request to the subsequent node, e.g. MSC B. The SIP INVITE request contains encapsulated SDP containing a "c-line" with unspecified IP address (0.0.0.0). MSC A can also decide to recommend a media gateway and to indicate the identity of the recommended MGW B using a new SDP attribute "mgwid". According to the present embodiment, the value of this SDP attribute contains the same unspecified IP address as in the "c-line" and in addition a unique identification MGWID B of MGW B (step 1). Upon reception of the SIP INVITE message from MSC A, MSC B compares the IP address in the SDP "mgwid" attribute with the IP address in the corresponding SDP "c-line". As both IP addresses are equal, the MSC B uses the MGW identity MGWIDB in the SDP "mgwid" attribute for the selection of the media gateway. It determines that it has a control interface towards MGW B and decides to request the reservation of resources at this MGW. MSC B instructs the MGW B to reserve resources for two interconnected terminations. MGW B confirms the reservation of the resources and indicates that it allocated IP address IPB1 and IPB2 to the terminations (step 2). According to FIG. 8, network address IPB1 is used for continuing the session initiation process in steps 3 and 4. In step 5, MSC B configures MGW B to send media using network address IPC. It is to be noted that steps 3 to 5 may be replaced by some other signaling, e.g. ISUP (ISDN user part) signaling or signaling towards a mobile terminal.

In step 6, node B generates a SIP or SIP-I message, in this case SIP 183 Session Progress, and transmits it to MSC A. The thus transmitted message contains, as a non-limiting example, a SDP data part including a SDP "c-line" ("c=") reciting the network address IPB2 assigned by MGW B according to normal SIP/SDP rules and a SDP attribute ("a=mgwid") reciting both the pre-selected or recommended MGW identity MGWIDB and an added network address IPB2 corresponding to the pre-selected or recommended media gateway as verification data. According to the present embodiment, the value of this new SDP attribute "mgwid" contains the same IP address IPB2 as in the "c-line" and in addition a unique identification MGWIDB of media gateway B. When receiving this message, among others, the MSC A determines on the basis of the "c-line" content, i.e. IPB2, that the content of the "c-line", i.e. IPB2, is equal to the content of the verification data in the SDP attribute, i.e. IPB2. Hence, received media gateway identity MGWIDB is used for MGW selection. It determines that it has a control interface towards MGW B and decides to request the reservation of resources at this media gateway. It instructs the MGW B to reserve resources for a termination that sends media towards IP address IPB2 (step 7). MGW B determines that IP address IPB2 is an own IP address and configures some internal shortcut to connect that termination with the termination reserved in step 2, thereby saving external transport resources and internal processing resources.

Thus, according to the operation of FIG. 8, both MSC A and MSC B are configured to perform any one of the methods of FIG. 2 and FIG. 3 at the sending side as well as any one the methods of FIG. 4 and FIG. 5 at the receiving side.

Figure 9:
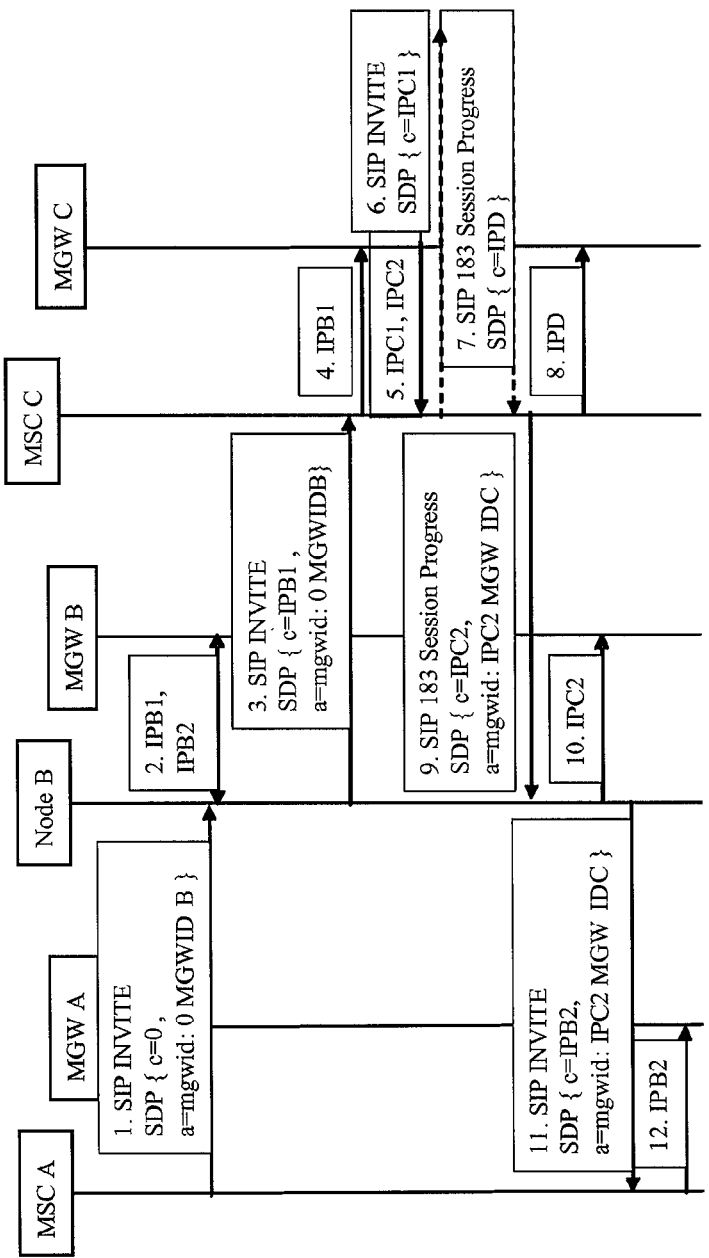
FIG. 9 shows a signaling diagram of a deferred media gateway selection with an intermediate node according to an exemplary embodiment of the present invention.

FIG. 9 shows a signaling diagram of a deferred media gateway selection with an intermediate node according to an exemplary embodiment of the present invention. It is assumed that the intermediate node B does not support MGW selection based on SIP or SIP-I with MGW identity encoding according to SDP.

Step 1 of FIG. 9 is equivalent to that of FIG. 8. Then, some Node B, e.g. a SBC or SIP-ALG, that does not support optimized MGW selection and the related "mgwid" attribute, receives the SIP INVITE message and ignores the "mgwid" attribute. It inserts an own media gateway MGW B, which may either be in the same physical entity as the Node B or in a splitted separate physical entity. The MGW B may for instance be inserted for IP version conversion or as a media plane firewall and may pass media without transcoding. Node B instructs the MGW B to reserve resources for two terminations, and MGW B confirms the reservation of the resources and indicates that it allocated IP address IPB1 and IPB2 to the terminations (step 2). In step 3, node B forwards the SIP INVITE message to a further network apparatus MSC C. The SIP INVITE contains a SDP "c-line" with IP address IPB1. As it does not understand the SDP "mgwid" attribute, node B forwards this attribute without modification. Upon reception of the SIP INVITE message, MSC C compares the IP address in the SDP "mgwid" attribute with the IP address in the corresponding SDP "c-line". As both IP addresses are not equal, the MSC C does not use the MGWID B in the SDP "mgwid" attribute for the (pre-)selection of the media gateway. It rather selects a media gateway MGW C. The (pre-)selection may for instance determine a media gateway in an optimized location with respect to the next hop where MSC C routes the call to be established. MSC C instructs the MGW C to reserve resources for a termination that sends media towards IP address IPB1 and to reserve resources for another termination (step 4), and MGW C confirms the reservation of the resources and indicates that it allocated IP address IPC1 and IPC2 to the terminations (step 5). In steps 6 to 8, MSC C may forward the SIP INVITE message containing a SDP "c-line" with IP address IPC1, the MSC C may receive a SIP response message, e.g. a "183 Session Progress message", that contains the SDP answer with an IP address IPD in the "c-line", and the MSC C configures MGW C to send media towards IPD. It is to be noted that steps 6 to 8 may be replaced by some other signaling, e.g. ISUP (ISDN user part) signaling or signaling towards a mobile terminal.

In step 9, MSC C forwards the SIP response message received in step 7. The SIP response message contains encapsulated SDP containing a "c-line" that indicates IP address IPC2 assigned by MGW C according to normal SIP/SDP rules. The MSC C also indicates the identity of MGW C using a new SDP attribute "mgwid". According to the present embodiment, the value of this SDP attribute contains the same IP address IPC2 as in the "c-line" as verification data and in addition a unique identification MGWID C of media gateway MGW C. In step 10, node B configures MGW B to send media towards IPC2, and in step 11, node B forwards the SIP response message to MSC A. The SIP response message contains a SDP c-line with IP address IPB2. As it does not understand the SDP "mgwid" attribute, node B forwards this attribute without modification. Upon reception of the SIP response, MSC A compares the IP address in the SDP "mgwid" attribute with the IP address in the corresponding SDP c-line. As both IP addresses are not equal, the MSC A does not use the MGWID C in the SDP "mgwid" attribute for the selection of the media gateway. It rather selects a MGW A. The selection may for instance determine a MGW in an optimized location with respect to the previous hop from where MSC A received the call. MSC A instructs the MGW A to reserve resources for a termination that sends media towards IP address IPB2 (step 12).

Thus, according to the operation of FIG. 9, MSC A is configured to perform any one of the methods of FIG. 4 and FIG. 5 at the receiving side as well as any one of the methods of FIG. 2 and FIG. 3 at the sending side, node B is not configured to perform any one of the methods described herein, and MSC C is configured to perform any one of methods of FIG. 2 and FIG. 3 at the sending side as well as any one of the methods of FIG. 4 and FIG. 5 at the receiving side.

Although "SIP INVITE" and "SIP 183 Session Progress" have been used above as non-limiting examples of messages in which pertinent information may be transferred, it is to be noted that any kind of message may be used additionally or alternatively. For example, any kind of "SDP offer" or "SDP answer" messages may be applied.

Although embodiments of the present invention have been described mainly with reference to methods, procedures and functions up to here, corresponding embodiments of the present invention also cover respective apparatuses, network nodes, including both software and hardware thereof.

The apparatuses depicted in FIG. 10 and FIG. 11 below may be implemented as standalone devices or as constituent parts of devices, network apparatuses, nodes or the like. Both apparatuses shown may also constitute a common system, e.g. by operationally coupled with or without intermediate nodes or apparatuses. Any one of the illustrated blocks represents a certain functionality and may be implemented in any conceivable manner, both in hardware or software or combined. That is, when the term "means for . . . " is used in the following, any physical implementation is intended to be covered, which is capable of realizing such a functionality. These may for example be any kind of processor, data processing unit, data generator or the like. In this sense, the term "means for . . . " is intended to have the same meaning and scope as the term "device configured to . . . ", wherein device may be any kind of physical implementation.

Figure 10:
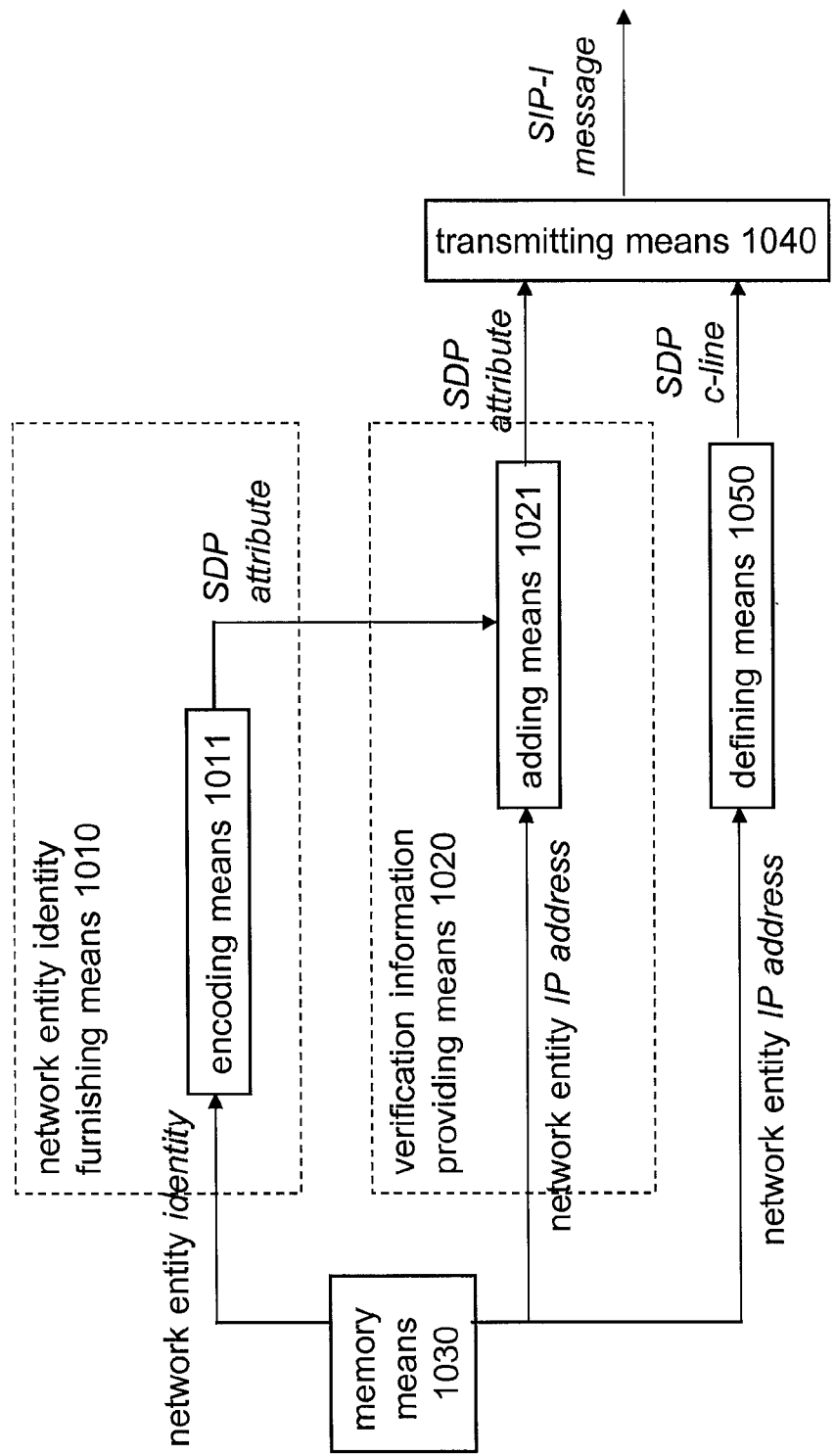
FIG. 10 shows a schematic block diagram of a first apparatus according to an exemplary embodiment of the present invention.
Figure 11:
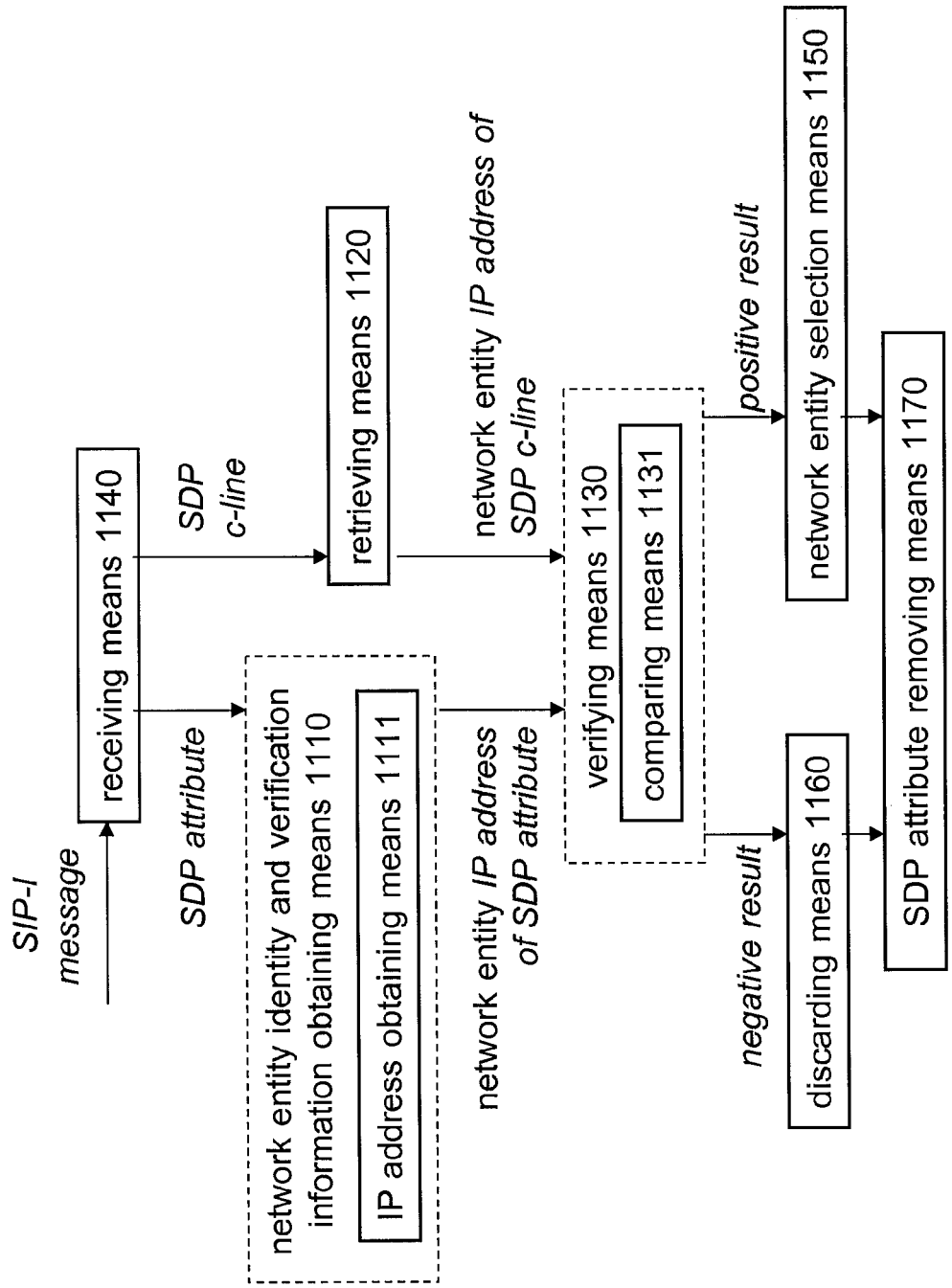
FIG. 11 shows a schematic block diagram of a second apparatus according to an exemplary embodiment of the present invention.

In FIG. 10 and FIG. 11 below, arrows between individual blocks represent operational couplings there-between as well as the direction of data flows on these couplings, and designations in italics represent data transferred on certain couplings.

FIG. 10 shows a schematic block diagram of an apparatus according to an exemplary embodiment of the present invention. The thus illustrated apparatus is configured to perform any one of the methods of FIG. 2 and FIG. 3 in a separated or combined manner. That is, also FIG. 10 comprises two levels of detail (the one according to FIG. 2 being depicted by broken lines, and the one according FIG. 3 being denoted by solid lines), these have to be regarded as two distinct embodiments of the present invention.

According to FIG. 10, an apparatus according to the present embodiment comprises means 1010 for furnishing an identity of a media gateway being pre-selected and means 1020 for providing verification information for said pre-selected media gateway identity, wherein the verification information are configured to enable to verify whether the pre-selected network entity identity is applicable for network entity selection at a second network apparatus. Both means 1010 and 1020 are supplied with the necessary information by way of a memory means 1030 storing the pertinent results of a media gateway (pre-) selection procedure. That is, when a media gateway is (pre-)selected, its identity and other data such as network address are deposited in memory means 1030 for future use. The memory means 1030 is operationally coupled with both means 1010 and 1020 and may be of any kind, both permanent and temporary.

The furnishing means 1010 according to the present embodiment is constituted by means 1011 for encoding the pre-selected MGW identity in some parameter for transmission, preferably in a SDP attribute.

The providing means 1020 according to the present embodiment is constituted by means 1021 for adding a network address such as an IP address of the pre-selected media gateway to the thus encoded transmission parameter, e.g. SDP attribute.

The apparatus according to the present embodiment further comprises means 1040 (e.g. sender) for transmitting the pre-selected media gateway identity and the verification data to another apparatus in a session initiation protocol (SIP or SIP-I) message.

According to one aspect of the present embodiment, the apparatus also comprises means 1050 for defining a network address such as an IP address of the pre-selected media gateway as connection data, preferably as SDP "c-line". If so, the transmitting means 1040 is further configured to transmit this connection data in a session initiation protocol (SIP or SIP-I) message.

FIG. 11 shows a schematic block diagram of an apparatus according to an exemplary embodiment of the present invention. The thus illustrated apparatus is configured to perform any one of the methods of FIG. 4 and FIG. 5 in a separated or combined manner. That is, also FIG. 11 comprises two levels of detail (the one according to FIG. 4 being depicted by broken lines, and the one according FIG. 5 being denoted by solid lines), these have to be regarded as two distinct embodiments of the present invention.

According to FIG. 11, an apparatus according to the present embodiment comprises means 1110 for obtaining an identity of a pre-selected media gateway and verification information for said pre-selected media gateway identity, and means 1130 for verifying, on the basis of the verification information, whether the pre-selected network entity identity obtained is applicable for network entity selection at the present apparatus.

According to one aspect of the present embodiment, the apparatus further comprises means (e.g. receiver) 1140 for receiving the pre-selected media gateway identity and the verification data from another apparatus in a session initiation protocol (SIP or SIP-I) message. Such a message may for example comprise the pre-selected media gateway identity and a network address such as the IP address of the pre-selected media gateway in a SDP attribute, and a network address such as an IP address of the pre-selected media gateway as SDP connection data, preferably as SDP "c-line".

According to FIG. 11, the obtaining means 1110 comprises means 1111 for obtaining the network address of the pre-selected media gateway from the SDP attribute, i.e. means 1111 obtains an IP address from the SDP attribute as the verification data. Further, verifying means 1130 according to one embodiment is constituted by means 1131 for comparing the network address in the SDP attribute, as obtained by means 1110, with a network address in the SDP connection data (e.g. c-line), as retrieved by retrieving means 1120 for retrieving this information from the SDP "c-line", with each other. Furthermore, the apparatus may comprise means 1150 for using the pre-selected media gateway identity for media gateway selection, if the comparing means 1131 yields that the network addresses are equal (or, stated in other words, the verifying means 1130 yields that the pre-selected network entity identity is applicable for network entity selection), and means 1160 for discarding the pre-selected media gateway identity, if the comparing means 1131 yields that the network addresses are not equal (or, stated in other words, the verifying means 1130 yields that the pre-selected network entity identity is not applicable for network entity selection).

As an alternative, an apparatus according to an embodiment of the present invention may also comprise means 1170 for removing the SDP attribute from the SIP/SIP-I message, irrespective of the result yielded vy the comparing means 1170.

Figure 12:
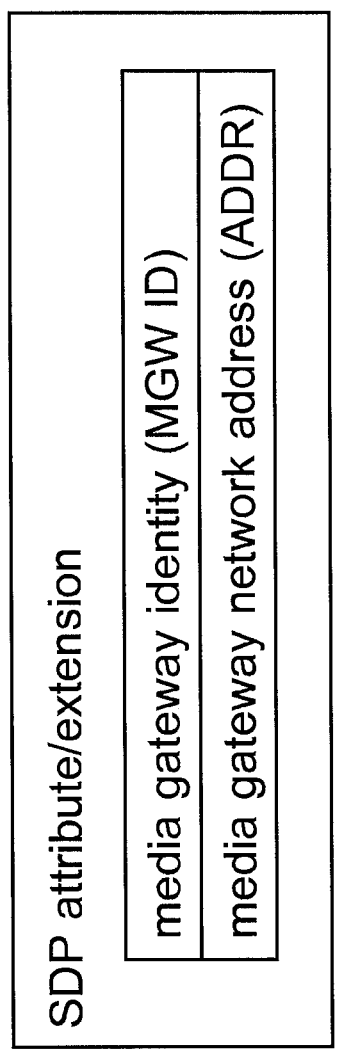
FIG. 12 shows a schematic representation of a first data structure according to an exemplary embodiment of the present invention.

FIG. 12 shows a schematic representation of a data structure according to an exemplary embodiment of the present invention.

As is exemplarily depicted by FIG. 12, a specific data structure according to an embodiment of the present invention may be represented by a SDP attribute or extension containing a data representation of an identity of a media gateway (MGW ID) and a representation of a network address (ADDR) of the media gateway, e.g. an IP address for user plane traffic over the media gateway. Note that an equivalent term for "network address" may be "connection address".

Hence, according to an embodiment of the present invention, a media gateway identity MGW ID (i.e. a MGW identifier) may exemplarily be encoded as the following "session-level" or "media level" SDP attribute (e.g. called "mgwid") with the following syntax (in ABNF definition):

MGW_Identifier="a=MGW_Identifier: <connection-address> <MGW_Id>"

The sub-field <connection-address>, i.e. the network address, may have the same encoding as defined for the <connection-address> sub-field of the SDP c-line in Clause 5.7 of RFC 4566. The sub-field <MGW_Id>, i.e. the identity of the media gateway, may be an octet string containing any octet value except 0x00 (Nul), 0x0A (LF), and 0x0D (CR).

The values are to be interpreted as in a standard character set. It is to be noted that the sub-field <MGW_Id> may be encoded for example in the same manner as BCU-ID in BICC, i.e. 4 Octets for representing Network ID field and Local BCU-ID field. The sub-field <MGW_Id> shall contain an operator-defined unique identifier for a media gateway. Attribute values of the SDP MGW_Identifier attribute shall not be subject to the SDP "charset" attribute.

As is described above, if the <connection-address> sub-field in the MGW_Identifier attribute and the <connection-address> sub-field of the corresponding SDP c-line do not match, an intermediate node not supporting the attribute has inserted something in the user plane, but passed the attribute transparently.

Figure 13:
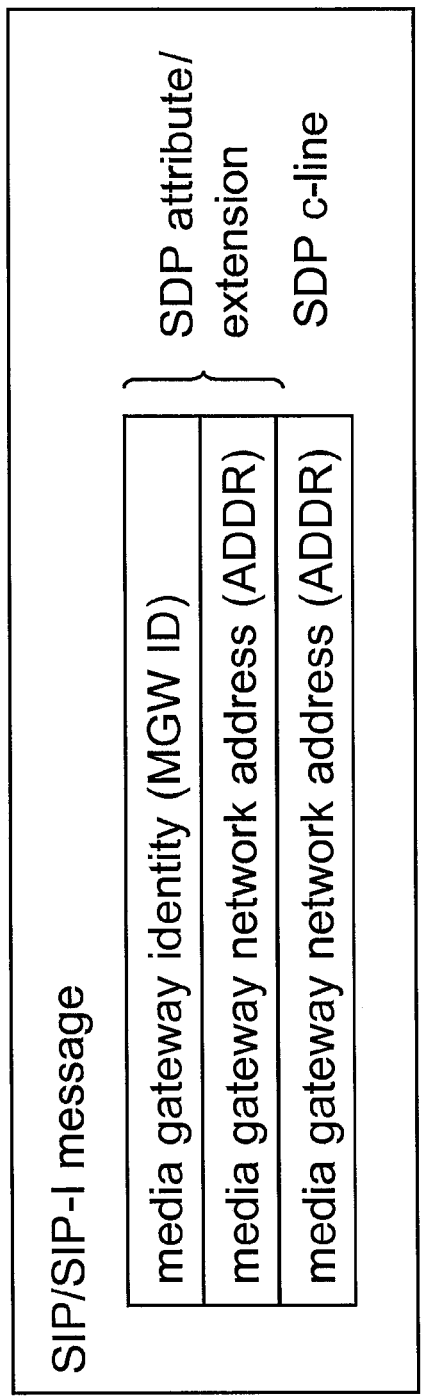
FIG. 13 shows a schematic representation of a second data structure according to an exemplary embodiment of the present invention.

FIG. 13 shows a schematic representation of a data structure according to an exemplary embodiment of the present invention.

As is exemplarily depicted by FIG. 13, a specific data structure according to an embodiment of the present invention may be represented by a SIP or SIP-I message format containing an identity of a media gateway (MGW ID) and a network address (ADDR) of the media gateway, e.g. an IP address for user plane traffic over the media gateway, in a SDP attribute part, and a network address (ADDR) of the media gateway, e.g. an IP address for user plane traffic over the media gateway, as SDP connection data, e.g. in the SDP "c-line". It is to be noted that, the network addresses in the SDP attribute and the SDP connection data may be equal or different, and may also be inserted by different entities, as may be seen by way of FIG. 6 to FIG. 9 above.

It is to be noted that the representation of data in FIG. 12 and FIG. 13 is merely illustrative, and may as well be illustrated in horizontal orientation or in any other order. Also, the SDP attribute/extension and the SIP/SIP-I message may contain further elements either in front of those depicted, in-between them, and/or after them.

Any functions, methods and operations described above may of course be implemented by way of software and/or hardware.

In general, it is to be noted that respective functional elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler. Method steps and/or devices or means likely to be implemented as hardware components at one of the entities are hardware independent and can be implemented using any known or future developed hardware technology or any hybrids of these, such as MOS, CMOS, BiCMOS, ECL, TTL, etc., using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Software in the sense of the present description comprises software code as such comprising code means for performing the respective functions, as well as software (or a computer program or a computer program product) embodied on a tangible medium such as a computer-readable storage medium having stored thereon a respective data structure or code portions or embodied in a signal or in a chip, potentially during processing thereof.

Generally, for the purpose of the present invention as described herein above, it should be noted that an access technology may be any technology by means of which a user equipment can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed lines but also circuits switched access technologies; access technologies may be distinguishable in at least two categories or access domains such as packet switched and circuit switched, but the existence of more than two access domains does not impede the invention being applied thereto, an access network may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user may experience services from an access network such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

What is claimed is:

1. A method of network entity selection, comprising
a first network apparatus furnishing, in a first sub-field of an attribute of a session description protocol encapsulation, an identity of a network entity being pre-selected with the first network apparatus,
the first network apparatus providing, in a second sub-field of the attribute of the session description protocol encapsulation, verification information that includes a network address for said pre-selected network entity,
the first network apparatus providing, in a connection line field of the session description protocol encapsulation, the network address of the pre-selected network entity, and
transmitting, to a second network apparatus either directly or through an intermediate network apparatus, the session description protocol encapsulation comprising the first sub-field, the second sub-field, and the connection line field,
wherein the verification information is configured to cause the second network apparatus to verify whether the pre-selected network entity identity is applicable for network entity selection at the second network apparatus as a result of the connection line field of the session description protocol encapsulation having a network address having been modified with the intermediate network apparatus to be different from the second sub-field of the session description protocol encapsulation having the network address for the pre-selected network entity, or not having been modified with the intermediate network apparatus such that the network address of the connection line field matches the network address within the second sub-field of the encapsulation, following transmission of the verification information from the first network apparatus.

2. The method according to claim 1, wherein the furnishing of the identity comprises
encoding the pre-selected network entity identity in the first sub-field of the attribute of the session description protocol encapsulation, and
wherein the providing of the verification information comprises
adding the network address of the pre-selected network entity to the second sub-field of the attribute of the session description protocol encapsulation.

3. The method according to claim 2, further comprising
defining the network address of the pre-selected network entity as session description protocol connection data, and
transmitting the thus defined network address as session description protocol connection data in a session initiation protocol message together with the session description protocol encapsulation.

4. The method according to claim 1, further comprising:
receiving an assignment from the pre-selected network entity, the assignment comprising the identity of the network entity;
wherein the identity of the pre-selected network entity is furnished in the first sub-field of the attribute of the session description protocol encapsulation, based on the assignment received from the pre-selected network entity.

5. The method according to claim 1, further comprising:
receiving a second session description protocol encapsulation;
wherein the second session description protocol encapsulation comprises a second identity of a second network entity pre-selected with a third network apparatus within a first sub-field of an attribute of the second session description protocol encapsulation, a network address of the second network entity within a second sub-field the attribute of the second session description protocol encapsulation, and information within a second connection line field;
comparing the network address of the second network entity within the second sub-field of the attribute of the second session description protocol encapsulation to the information within the second connection line field; and
in response to the network address of the second network entity within the attribute of the second session description protocol encapsulation being equal to the information within the second connection line field, using the identity of the second network entity within the attribute of the second session description protocol encapsulation for network entity selection; and
in response to the network address of the second network entity within the attribute of the second session description protocol encapsulation not being equal to the information within the second connection line field, using the information within the second connection line field for network entity selection.

6. The method according to claim 1, wherein:
the verification information is further configured to cause the second network apparatus to verify the pre-selected network entity identity as not being applicable for network entity selection at the second network apparatus as a result of the network address within the connection line field having been modified with the intermediate network apparatus to a network address different from the network address of the pre-selected network entity, following transmission of the verification information from the first network apparatus; and the verification information is further configured to cause the second network apparatus to verify the pre-selected network entity identity as being applicable for network entity selection at the second network apparatus as a result of the network address within the connection line field not having been modified with the intermediate network apparatus to a network address different from the network address of the pre-selected network entity, following transmission of the verification information from the first network apparatus.

7. The method according to claim 1, wherein the connection line field of the session description protocol encapsulation having been modified is due to the intermediate network apparatus not supporting the network address of the pre-selected network entity.

8. A method of network entity selection, comprising a second network apparatus obtaining an identity of a network entity pre-selected with a first network apparatus and verification information for the pre-selected network entity, the verification information including a network address of the pre-selected network entity;

receiving, either directly from the first network apparatus or from an intermediate network apparatus, a session description protocol encapsulation comprising the identity of the network entity, the verification information, and a connection line field initially having the network address of the pre-selected network entity;

wherein the identity of the network entity pre-selected with the first network apparatus is obtained from a first sub-field of an attribute of the session description protocol encapsulation, and the verification information that includes the network address of the pre-selected network entity is obtained from a second sub-field of the attribute of the session description protocol encapsulation; and verifying, on the basis of the verification information, whether the obtained network entity identity is applicable for network entity selection as a result of the connection line field of the session description protocol encapsulation having a network address having been modified with the intermediate network apparatus to be different from the second sub-field of the session description protocol encapsulation having the network address for the pre-selected network entity or not having been modified with the intermediate network apparatus such that the network address of the connection line field matches the network address within the second sub-field of the encapsulation, following transmission of the verification information from the first network apparatus.

9. The method according to claim 8, further comprising receiving the pre-selected network entity identity and the verification information in a session initiation protocol message, wherein the session initiation protocol message includes the pre-selected network entity identity and the network address of the pre-selected network entity in the attribute of the session description protocol encapsulation, and the network address of the pre-selected network entity of the connection line field as session description protocol connection data.

10. The method according to claim 9, further comprising retrieving the network address of the pre-selected network entity from the connection line field, and wherein the obtaining of the verification information comprises obtaining the network address of the pre-selected network entity from the attribute of the session description protocol encapsulation.

11. The method according to claim 10, wherein the verifying comprises comparing the obtained network address in the second sub-field of the attribute of the session description protocol encapsulation to the retrieved network address of the session description protocol connection data retrieved from the connection line field of the session description protocol encapsulation.

12. The method according to claim 11, further comprising using the obtained network entity identity for network entity selection, in response to the comparison yielding that the compared network addresses are equal, and discarding the obtained network entity identity, in response to the comparison yielding that the network addresses are not equal.

13. The method according to claim 8, further comprising:

retrieving a different network identity from the connection line field having the different network identity after the connection line field has been modified with the intermediate network apparatus; and transmit the different network identity to a third network apparatus, the different network identity being a recommendation to the third network apparatus to use the different network identity for network entity selection.

14. An apparatus, comprising a device configured to furnish, in a first sub-field of an attribute of a session description protocol encapsulation, an identity of a network entity being pre-selected with a first network apparatus in a session description protocol attribute, a device configured to provide, in a second sub-field of the attribute of the session description protocol encapsulation, verification information for the pre-selected network entity identity, the verification information including a network address of the pre-selected network entity, and a device configured to provide, in a connection line field of the session description protocol encapsulation, the network address of the pre-selected network entity, wherein the first network apparatus transmits, to a second network apparatus either directly or through an intermediate network apparatus, the session description protocol encapsulation comprising the first sub-field, the second sub-field, and the connection line field, wherein the verification information is configured to cause the second network apparatus to verify whether the pre-selected network entity identity is applicable for network entity selection at the second network apparatus as a result of the connection line field of the session description protocol encapsulation having a network address having been modified with the intermediate network apparatus to be different from the second sub-field of the session description protocol encapsulation having the network address for the pre-selected network entity, or not having been modified with the intermediate network apparatus such that the network address of the connection line field matches the network address within the second sub-field of the encapsulation, following transmission of the verification information from the first network apparatus.

15. The apparatus according to claim 14, wherein the device configured to furnish comprises
a device configured to encode the pre-selected network entity identity in the first sub-field of the attribute of the session description protocol encapsulation, and wherein the device configured to provide the verification information comprises
a device configured to add the network address of the pre-selected network entity to the second sub-field of the attribute of the session description protocol encapsulation.

16. The apparatus according to claim 15, further comprising
a device configured to define the network address of the pre-selected network entity as session description protocol connection data, and
a device configured to transmit the thus defined network address as session description protocol connection data in a session initiation protocol message together with the session description protocol encapsulation.

17. The apparatus according to claim 14, wherein the network entity is a media gateway.

18. An apparatus, comprising
a device configured to obtain an identity of a network entity pre-selected with a first network apparatus and verification information for the pre-selected network entity, the verification information including a network address of the pre-selected network entity;
a device configured to receive, either directly from the first network apparatus or from an intermediate network apparatus, a session description protocol encapsulation comprising the identity of the network entity, the verification information, and a connection line field initially having the network address of the pre-selected network entity;
wherein the identity of the network entity pre-selected with the first network apparatus is obtained from a first sub-field of an attribute of the session description protocol encapsulation, and the verification information that includes the network address of the pre-selected network entity is obtained from a second sub-field of the attribute of the session description protocol encapsulation; and
a device configured to verify whether the obtained network entity identity is applicable for network entity selection as a result of the connection line field of the session description protocol encapsulation having a network address having been modified with the intermediate network apparatus to be different from the second sub-field of the session description protocol encapsulation having the network address for the pre-selected network entity, or not having been modified with the intermediate network apparatus such that the network address of the connection line field matches the network address within the second sub-field of the encapsulation, following transmission of the verification information from the first network apparatus.

19. The apparatus according to claim 18, further comprising
a device configured to receive the pre-selected network entity identity and the verification information in a session initiation protocol message,
wherein the device configured to receive the pre-selected network entity and the verification information receives the session initiation protocol message containing the pre-selected network entity identity and the network address of the pre-selected network entity in the attribute of the session description protocol encapsulation, and the network address of the pre-selected network entity of the connection line field as session description protocol connection data.

20. The apparatus according to claim 19, further comprising
a device configured to retrieve the network address of the pre-selected network entity from the connection line field, and
wherein the device configured to obtain the verification information comprises
a device configured to obtain the network address of the pre-selected network entity from the attribute of the session description protocol encapsulation.

21. The apparatus according to claim 20, wherein the device configured to verify comprises
a device configured to compare the obtained network address in the second sub-field of the attribute of the session description protocol encapsulation to the retrieved network address of the session description protocol connection data retrieved from the connection line field of the session description protocol encapsulation.

22. The apparatus according to claim 21, further comprising
a device configured to use the obtained network entity identity for network entity selection, in response to the device configured to compare yielding that the compared network addresses are equal, and
a device configured to discard the obtained network entity identity, in response to the device configured to compare yielding that the compared network addresses are not equal.

23. The apparatus according to claim 18, wherein the network entity is a media gateway.

24. A computer program embodied on a non-transitory computer-readable medium, the program controlling a processor to perform
furnishing, in a first sub-field of an attribute of a session description protocol encapsulation, an identity of a network entity being pre-selected with a first network apparatus,
providing, in a second sub-field of the attribute of the session description protocol encapsulation, verification information that comprises a network address for said pre-selected network entity identity,
providing, in a connection line field of the session description protocol encapsulation, the network address of the pre-selected network entity, and
transmitting, to a second network apparatus either directly or through an intermediate network apparatus, the session description protocol encapsulation comprising the first sub-field, the second sub-field, and the connection line field;
wherein the verification information is configured to cause the second network apparatus to verify whether the pre-selected network entity identity is applicable for network entity selection at the second network apparatus as a result of the connection line field of the session description protocol encapsulation having a network address having been modified with the intermediate network apparatus to be different from the second sub-field of the session description protocol encapsulation having the network address for the pre-selected network entity, or not having been modified with the intermediate network apparatus such that the network address of the connection line field matches the network address within the second sub-field of the encapsulation, following transmission of the verification information from the first network apparatus.

25. A computer program embodied on a non-transitory computer-readable medium, the program controlling a processor to perform obtaining an identity of a network entity pre-selected with a first network apparatus and verification information for the pre-selected network entity, the verification information comprising a network address of the pre-selected network entity;

receiving, either directly from the first network apparatus or from an intermediate network apparatus, a session description protocol encapsulation comprising the identity of the network entity, the verification information, and a connection line field initially having the network address of the pre-selected network entity;

wherein the identity of the network entity pre-selected with the first network apparatus is obtained from a first sub-field of an attribute of the session description protocol encapsulation, and the verification information that comprises the network address of the pre-selected network entity is obtained from a second sub-field of the attribute of the session description protocol encapsulation; and verifying, on the basis of the verification information, whether the obtained network entity identity is applicable for network entity selection as a result of the connection line field of the session description protocol encapsulation having a network address having been modified with the intermediate network apparatus to be different from the second sub-field of the session description protocol encapsulation having the network address for the pre-selected network entity, or not having been modified with the intermediate network apparatus such that the network address of the connection line field matches the network address within the second sub-field of the encapsulation, following transmission of the verification information from the first network apparatus.

* * * * *